UNITED STATES PATENT OFFICE.

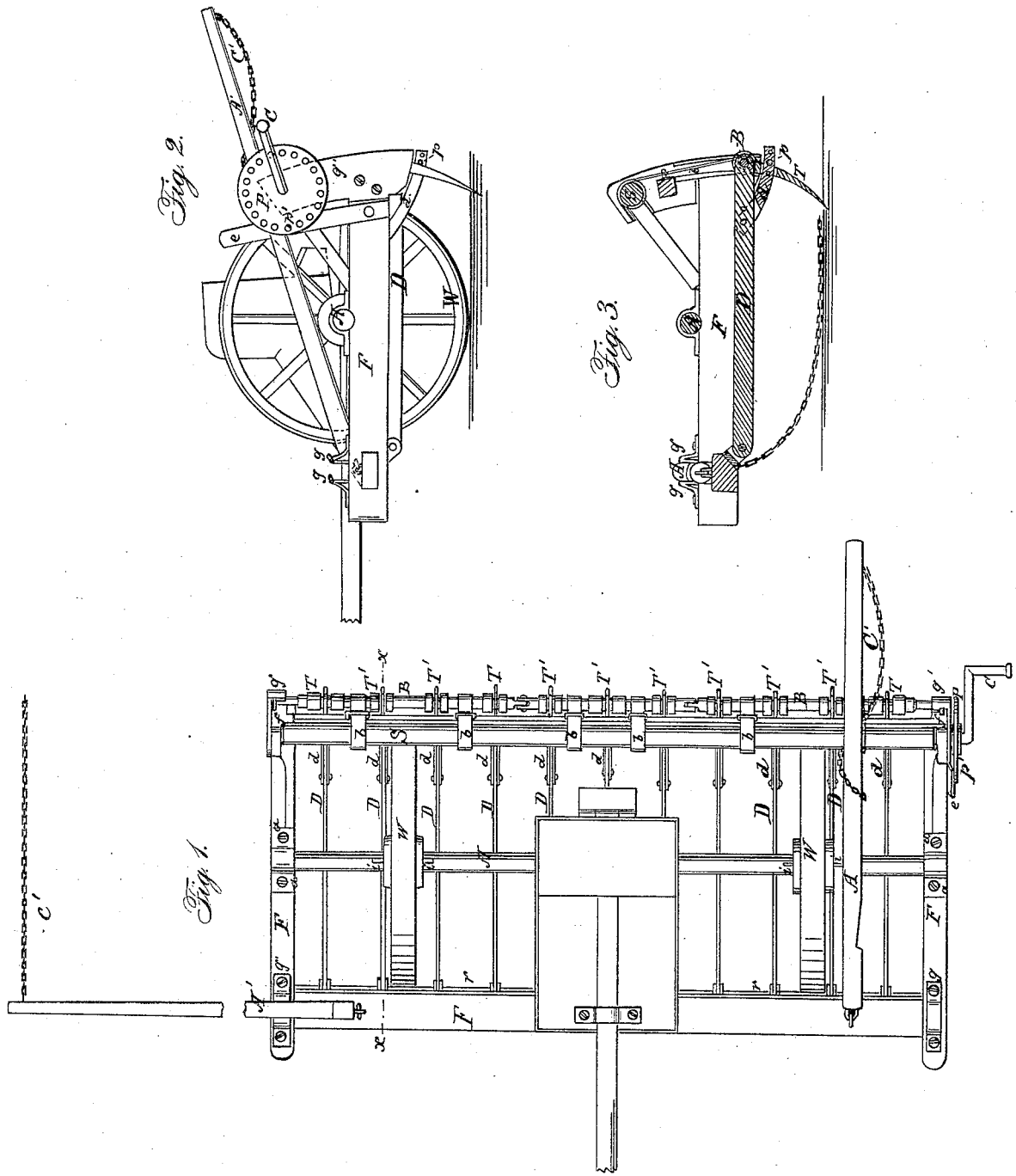

SAMUEL HOAKE, OF FREDERICK, MARYLAND.

IMPROVEMENT IN CULTIVATORS.

Specification forming part of Letters Patent No. 27,632, dated March 27, 1860.

*To all whom it may concern:*

Be it known that I, S. HOAKE, of Frederick, in the county of Frederick and State of Maryland, have invented a new and useful Improvement in Cultivators and Markers; and I do hereby declare that the following is a full, clear, and exact description of the same, reference being had to the annexed drawings, forming part of this specification, in the several figures of which similar characters of reference denote the same part.

Figure 1 is a top view of my cultivator. Fig. 2 is a side view of the same. Fig. 3 is a vertical section on line $x\ x$.

This invention has for its object the construction of a cultivator, so as to lay off the ground in regular rows for planting the corn, and for cultivating it afterward; and its nature consists in having on the back part of the frame a shaft or bar extending across it, on which the shovels are jointed by the shaft passing through their eyes. There are three broad shovels for laying off the rows, and four smaller ones between each of the large ones for cultivating. The drag-bars are on the shaft between the eyes of the shovels and jointed to the front of the frame by a rod passing through the jaws to which they are attached. To these main drag-bars are jointed smaller ones extending through slots in the shovels and held there by wooden pins.

The shovel-shaft is composed of three parts jointed together by bolts, so that in passing over uneven ground one part may be raised without moving the rest. Above the shovels is a shaft turned by a crank, with straps attached to it and passing through guides on a bar of the frame to the shovel-shaft. By turning this shaft the straps are wound around it and the shovels raised or lowered. At the crank end of the shaft is a circular plate with holes around the edge, and there is a spring attached to the side of the frame with a pin on it, which fits into the holes in the circular plate and holds the shaft in the position desired. The shovel-shaft has a flange on each end extending upward and moving in guides to keep it in position, so that should the shaft be lowered even below the guides the flanges would be still in them and keep it in place. Across the center of the frame passes a shaft or axle, which is bolted to the frame, and on which are the wheels, which are held in place on it by pins through slots in it, and may be adjusted by unbolting the axle from the frame and moving the wheels and fastening them again by the pins and bolting the axle to the frame as before. The tongue is in the center of the machine, so as to throw the horses on each side of the center row. On the front beam of the frame are two jointed arms, which can be turned out on each side of the cultivator, and have on their ends heavy chains which drag on the ground and make a track for the horse to walk in in making the return rows.

In the drawings, F is the frame; B, the jointed shovel-shaft; T, the shovels for laying off the rows, and T' the small ones for cultivating; D, the drag-bars; $d$, the small ones passing through the slots of the shovels and held by wooden pins $p$. S is the shaft turned by crank C, and having straps $b$ attached to shovel-shaft B, by which the depth of cultivating is regulated. P is the circular plate on shaft S, in the holes of which the pin $p'$ on spring $e$ fits and holds the shovel-shaft in the desired position. $f$ is the flanges on shovel-shaft B, moving in guides $g$. $r$ is the rod passing through drag-bars D and their jaws in the front part of the frame. A is the axle, secured to the frame by bolt $a$, on which are wheels W, held in place by pins $i$ in slots of the axle, and which are adjustable on the axle. A' are the jointed arms; C', the chains at their ends, which drag on the ground and mark the track for the horse to take on the next round. The arms A' are held in place when used by guides $g'$.

When laying off the ground for planting the jointed shovel-shaft B is taken apart and the smaller shovels T' removed, leaving the large ones on, and in cultivating it the large ones are taken off and the small ones left on; also, in preparing the ground before seeding the large shovels can be taken off and small ones put in their places, thus forming a row of shovels which break up the ground well and prepare it for the seed. Should the shovels come in contact with rocks or any obstruction the pressure against the wooden pins $p$ will break it, and the shovel will slip off the drag-bar $d$, and thus prevent any injury to the shovel.

The shovels are raised and lowered by means of the straps $b$ winding around shaft S, thus regulating the depth of cultivating, and also the shovels raised off the ground in going to and from the field, and in turning.

The wheels W are adjustable on the axle A, as before described, and by turning arms A' out on either side of the cultivator, between the guides $g'$, the chain C' will drag on the ground and mark a track for the near horse to walk in when making the next round, and these arms A', being the length of one row and a half, will regulate the distance of the rows from each other, keeping them all the same distance apart.

The driver's seat contains a box for holding the shovels not in use, and one for the wooden pins $p$ in case of any of them breaking.

Having thus described my invention, what I claim, and desire to secure by Letters Patent, is—

1. The combination of the jointed shovel-shaft B, slotted shovels T and T', drag-bars D and $d$, shaft S, straps $b$, spring-detent $e$, and guides $g$, substantially as described.

2. In combination with the foregoing, the adjustment of wheels W on axle A by bolts $a$ and pins $i$, as specified.

In testimony whereof I have hereunto signed my name before two subscribing witnesses.

SAMUEL HOAKE.

Witnesses:
  JAS. D. CLARY,
  W. CROSSFIELD.